United States Patent [19]

Kling

[11] 4,194,794
[45] Mar. 25, 1980

[54] AXIAL BEARING FOR ROTARY DRILL BIT

[75] Inventor: Knut Å. Kling, Sandviken, Sweden

[73] Assignee: Sandvik Aktiebolag, Sandviken, Sweden

[21] Appl. No.: 909,117

[22] Filed: May 24, 1978

[30] Foreign Application Priority Data

Jun. 3, 1977 [SE] Sweden ............................ 7706480

[51] Int. Cl.² .......................................... F16C 19/00
[52] U.S. Cl. ...................................... 308/3.8; 175/17;
175/337; 308/239; 308/DIG. 8
[58] Field of Search ................. 308/8.2, 239, DIG. 8;
175/17, 227, 228, 337, 371, 372

[56] References Cited

U.S. PATENT DOCUMENTS

| 2,880,970 | 4/1959 | Swart | 175/337 |
|---|---|---|---|
| 3,921,735 | 11/1975 | Dysart | 308/8.2 |
| 3,995,917 | 12/1976 | Quinlan | 308/8.2 |
| 4,098,358 | 7/1978 | Klima | 175/337 |
| 4,109,974 | 8/1978 | Svanstrom et al. | 308/8.2 |

Primary Examiner—Charles E. Frankfort
Attorney, Agent, or Firm—Burns, Doane, Swecker & Mathis

[57] ABSTRACT

An unsealed rotary drill of the type comprising a bearing shaft, a roller rotatably mounted on the shaft, cutting inserts carried by the roller, bearing for rotatably supporting the roller on the shaft, and a flushing channel terminating at an end surface of the bearing shaft for conducting cooling air to the bearing. The bearing includes an axial bearing comprising an insert plate formed of sintered hard metal alloy, and a supporting plate formed of a material which is less hard and less wear resistant than the metal alloy. The supporting plate contains a solid lubricant. The supporting plate and the insert plate present opposed bearing surfaces. The insert plate is mounted in the end surface of the bearing shaft such that a rear surface of the insert plate is acted upon by cooling air from the flushing channel.

6 Claims, 7 Drawing Figures

AXIAL BEARING FOR ROTARY DRILL BIT

BACKGROUND AND OBJECTS OF THE INVENTION

The present invention relates to bearing means in drill bits for performing crushing type rotary drilling in rock, usually referred to as rotary drill bits. The invention may, however, also be used in other types of rotary drill bits, for instance drill bits for full face drilling of tunnels.

Bearings for roller drill bits are normally built according to either of two basic principles. One of these principles is to provide the bearing construction with seals and to supply the bearings with grease or oil from a small container in each leg of the bit. This bearing construction is usually used in oil drilling where the axial feed forces are moderate. The frictional work and the development of heat in the bearings is small and the temperature in the bearings can be held at a low level. Accordingly, it is not necessary to supply air or any other coolant to the bearing.

The other principle, on which the present invention is based, is that the bearing has no seals and that the drilling takes place with air flushing. This construction is used for blast hole drilling where the load on the bearings is substantial due to the great axial feed force. This necessitates air flushing through the bearings in order to keep the temperature low in the bearings. The air circulation through the drill bit does not permit the use of lubricants as in sealed bearings, because oil and grease in the bearings would not be retained in the bearings under the pressure of the flow of air.

It is known from U.S. Pat. No. 3,151,691 to use a metal harder than steel for axial and radial bearings in sealed drill bits according to the first mentioned basic principle. The drill bit described in the patent is obviously intended to be used for oil drilling. The said harder metal is for both sealed and unsealed bits, usually Stellite, attached by welding.

It is an object of the present invention to provide a plane bearing for unsealed roller drill bits cooled by air flushing, which bearing exhibits both substantially less wear than in the conventional art and a considerable increase in the load carrying capacity of the bearing.

BRIEF SUMMARY OF A PREFERRED EMBODIMENT OF THE INVENTION

According to the present invention this object is achieved by means of an unsealed rotary drill of the type comprising a bearing shaft, a roller rotatably mounted on the shaft, cutting inserts carried by the roller bearings for rotatably supporting the roller on the shaft, and a flushing channel terminating at an end surface of the bearing shaft for conducting cooling air to the bearing means. The bearings include an axial bearing comprising an insert plate formed of a sintered hard metal alloy, and a supporting plate formed of a material which is less hard and less wear resistant than the metal alloy. The supporting plate contains a solid lubricant. The supporting plate and the insert plate present opposed bearing surfaces. The insert plate is mounted in the end surface of the bearing shaft such that a rear surface of the insert plate is acted upon by cooling air from the flushing channel.

THE DRAWING

The invention is described in more detail in connection with a preferred embodiment thereof in the following specification and the appended drawings in which.

DETAILED DESCRIPTION OF A PREFERRED EMBODIMENT OF THE INVENTION

Figure 1:
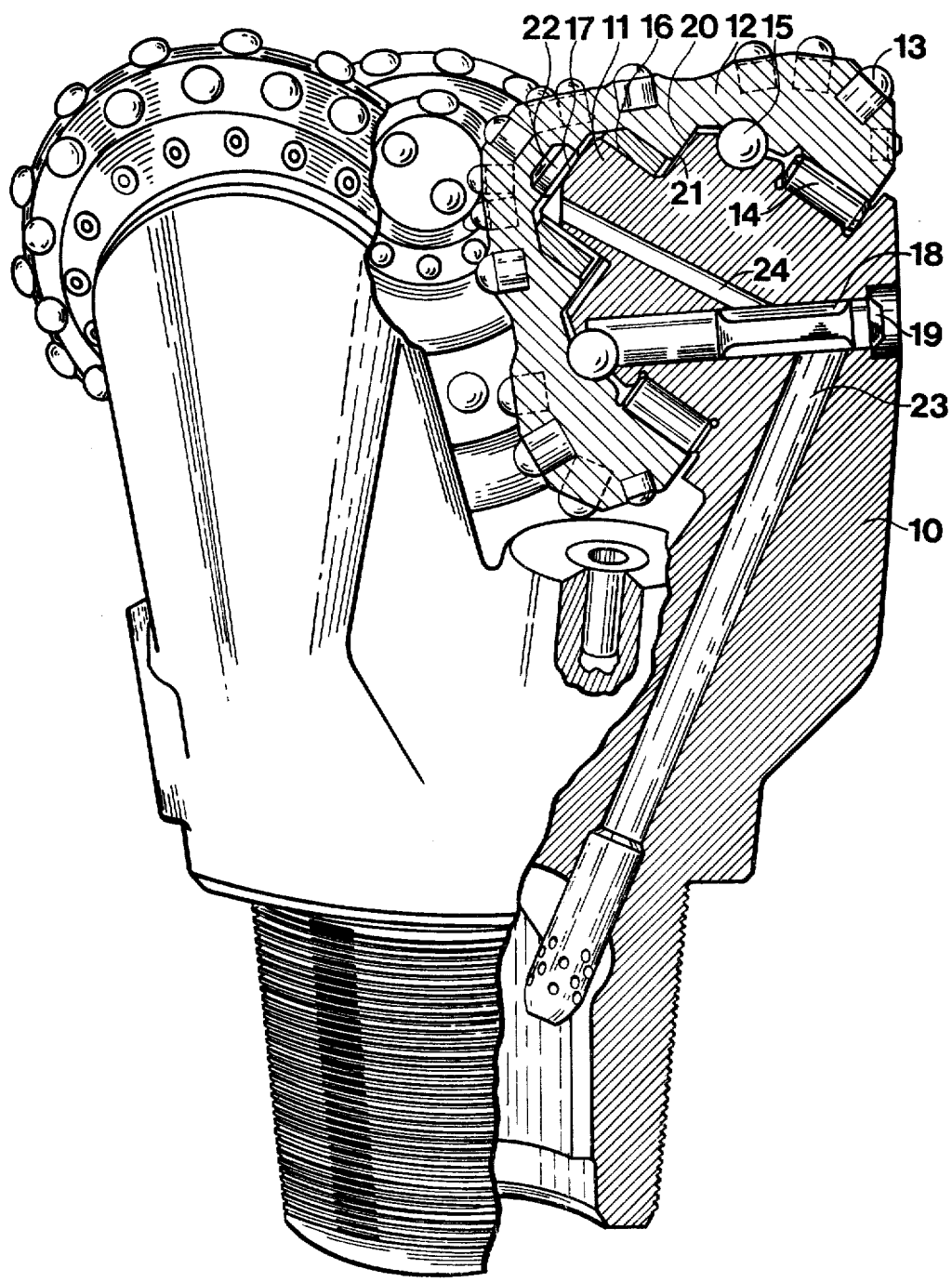
FIG. 1 shows a vertical section through a roller drill bit of conventional construction.
Figure 2:
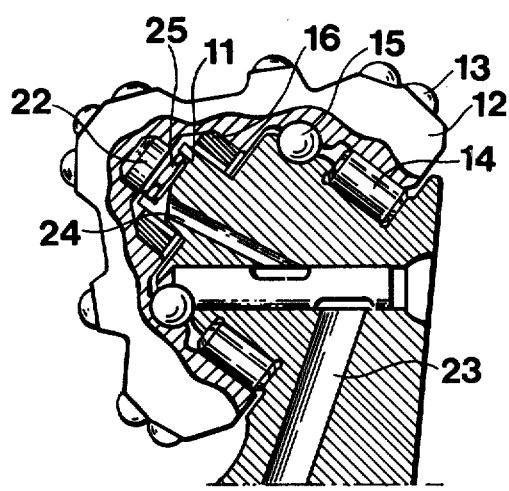
FIG. 2 shows a vertical section through a part of a roller drill bit according to an embodiment of the invention.

FIG. 1 shows a roller drill bit for blast hole drilling having three separate legs extending from a bit body one of which is shown in section in FIG. 1 and designated by 10. The end of the leg is shaped as a bearing shaft or lug 11, on which a roller 12 having cutting pins or other inserts is rotatably mounted. The inserts 13 are pressed into the outer surface of the roller 12 for the purpose of crushing the rock when the bit is rotated and fed forward in the drill hole.

The bearing means necessary for the rotation of the roller 12 comprise a system of roller bearings 14, a system of ball bearings 15, a radial bearing 16 and an axial bearing 17.

For insertion of the ball bearing balls 15 there is a channel 18 provided in the bearing lug 11 having a plug 19 inserted therein for retaining the separate balls 15. The cylindrical bearing 14 absorbs a great part of the force from the rock while the main task of the ball bearing 15 is to retain the roller 12 without actually absorbing any force. The axial forces on the roller 12 are in the main absorbed by the axial bearing 17, but moreover the roller 12 is provided with a shoulder 20 adapted to abut against a shoulder 21 on the bearing lug 11, thus absorbing part of the axial load.

The axial bearing 17 consists of a support plate 22 of hardened steel which is pressed into the top of the roller 12 and is applied in supporting abutment against the axial end surface of the bearing lug 11. Also the bearing lug is usually made of hardened steel but its axial bearing surface is covered with a hard-facing deposit material such as Stellite.

Cooling air with possible additives, for instance for dust binding, is supplied to the axial bearing 17 through the channels 23 and 24. In spite of this cooling and in spite of the fact that the bearing works with a solid lubricant in the support plate 22 this bearing is subjected to great wear which also affects the other bearings in the roller 12 and thus limits the life of the drill bit.

According to the invention the bearing lug 11 is provided with a bearing surface which forms an axial bearing and is made of a sintered hard metal alloy of the type which contains one or more carbides as carbide of tungsten, titanium, tantalum and/or niobium, as well as a bonding metal as cobalt, nickel and/or iron. This bearing surface on the lug 11 has the form of a plate or insert 25 (FIGS. 3-5) which is pressed into a corresponding recess in the bearing lug. The contact or bearing surface 26 of the insert plate 25 is ground to a plane shape parallel with the contact surface of the opposed support plate 22. The diameter of the sintered metal plate 25 should be greater than the cooperating bearing surface of the support plate 22. The last mentioned plate 22 should be made of hardened steel, which is less hard and less wear resistant than the metal alloy of the plate 25, preferably of the hardness range 60 to 65 HRC. The bearing is lubricated by a solid lubricant which is applied to grooves 27 in the support plate 22 as shown in FIG. 5.

The insert plate 25 is mounted such that a portion of a rear side 30 thereof is exposed for communication with the flushing channel 24. For cooling the axial bearing 17 cooling air is supplied through the channel 24 extending substantially axially through the shaft 11 of the bearing and is blown against the exposed portion of the rear side 30 and the edge 31 of the sintered metal insert plate 25. It is important that the frictional heat from the axial bearing be conducted away effectively. This is achieved by means of said air cooling which makes use of the good heat conduction of the sintered metal.

Figure 3:
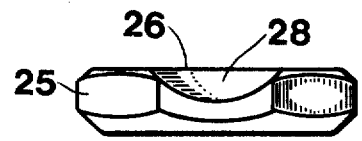
FIG. 3 shows an elevational view of one of the bearing surfaces of the bearing means according to the invention in the form of an insert.
Figure 4:
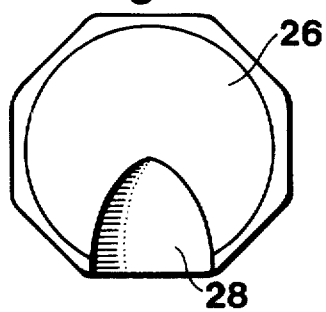
FIG. 4 shows an end view of the insert in FIG. 3.
Figure 5:
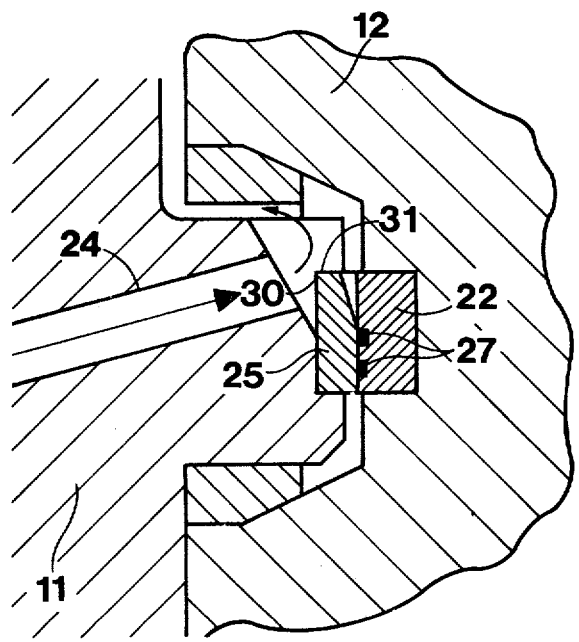
FIG. 5 shows a fragmentary view of FIG. 2, on a larger scale.

In the preferred embodiment in FIGS. 3 and 4 the bearing surface of the sintered metal insert 25 is provided with a recess 28 which has a rounded cross section and also extends through one edge side of the insert and communicates with the channel 24. This allows removal of wear products from the bearing surfaces.

Figure 6:
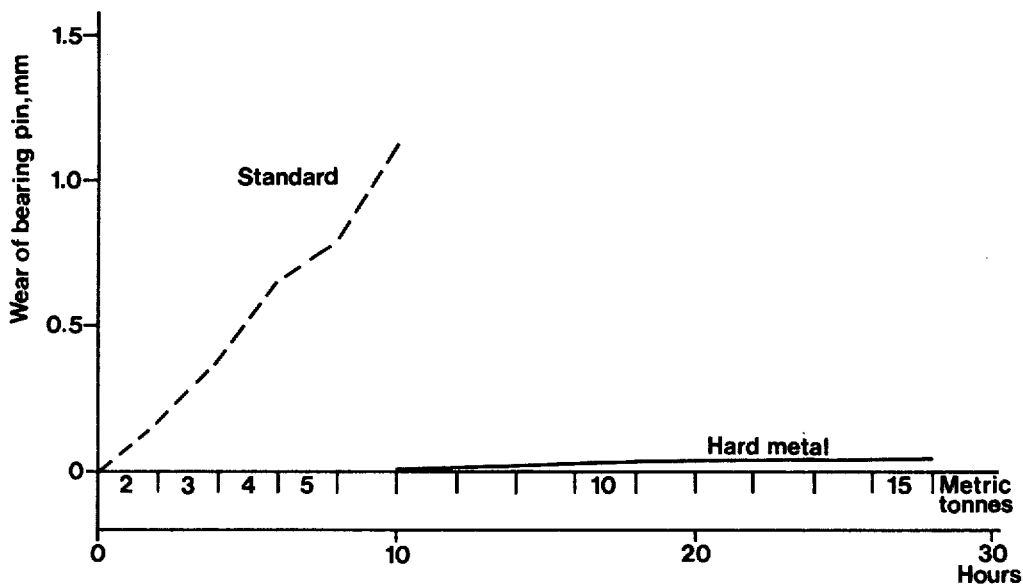
FIG. 6 shows a diagram of the wear of the bearing lug in a roller drill bit as a function of time for increasing load.
Figure 7:
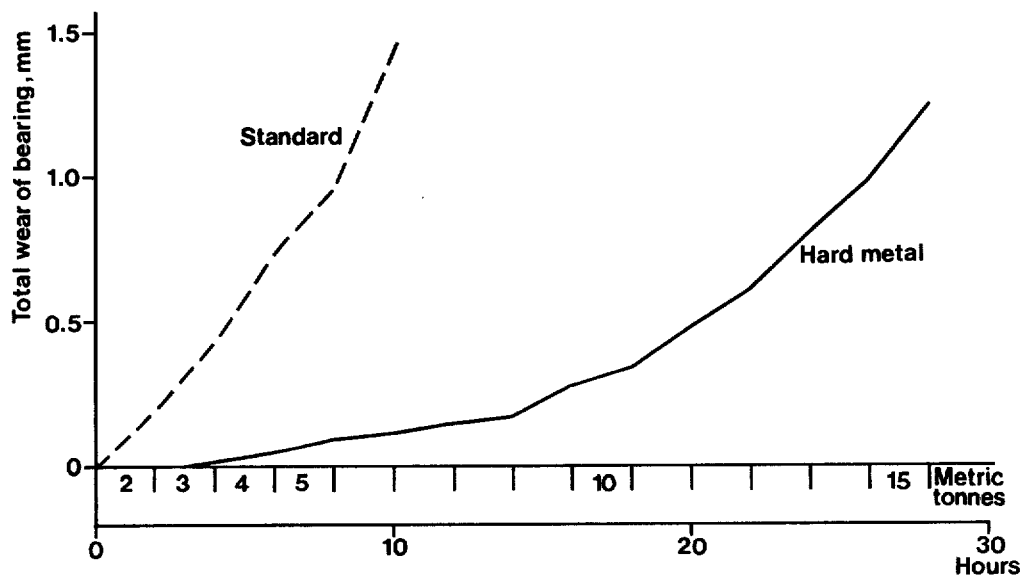
FIG. 7 shows a diagram of the total wear of the bearing as a function of time and increasing load.

FIG. 6 shows results achieved with the invention in regard to the wear of the bearing lug 11 measured in millimeters as a function of time and increasing load, as compared with a standard axial bearing built in a conventional way of the type shown in FIG. 1. The design referred to as "standard" comprised a bearing plate surface of case hardened steel with a hardness about 63 HRC while the cooperating lug bearing surface was a hard-facing deposit alloy having a hardness of about 57 HRC attached to the axial end surface of the bearing lug. In the design according to the invention the support plate 22 was also made of hardened steel with a hardness 63 HRC while the sintered metal alloy 26 comprised a plate of tungsten carbide with cobalt as bonding agent. From this it is obvious that the design according to the invention has provided a substantially lower wear of the shaft lug. Also the wear of the supporting plate 22 has become less, which results in that the total bearing wear is strongly reduced at the same time as the load capacity of the bearing is drastically increased as shown in FIG. 7.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In an unsealed rotary drill of the type comprising a bearing shaft, a roller rotatably mounted on the shaft, cutting inserts carried by the roller, bearing means for rotatably supporting the roller on the shaft, and a flushing channel terminating at an end surface of the bearing shaft for conducting cooling air to the bearing means; the improvement wherein said bearing means includes an axial bearing comprising an insert plate formed of a sintered hard metal alloy, and a supporting plate formed of a material which is less hard and less wear resistant than said metal alloy; said supporting plate containing a solid lubricant; said supporting plate and said insert plate presenting opposed bearing surfaces; said insert plate being mounted in said end surface of said bearing shaft such that an outer portion of a rear surface and a portion of a peripheral side edge surface of said insert plate are acted upon by cooling air from said flushing channel; said bearing surface of said insert plate including a recess terminating at said edge portion of said insert plate for permitting removal of wear products from the bearing surface and entrainment of such wear products into the cooling air.

2. Apparatus according to claim 1, wherein said supporting plate is formed of hardened steel, said insert plate having a larger diameter than the bearing surface of said supporing plate.

3. Apparatus according to claim 2, wherein said supporting plate is formed of steel having a hardness in the range of 60-65 HRC.

4. In an unsealed rotary drill of the type comprising a bearing shaft, a roller rotatably mounted on the shaft, cutting inserts carried by the roller, bearing means for rotatably supporting the roller on the shaft, and a flushing channel terminating at an end surface of the bearing shaft for conducting cooling air to the bearing means; the improvement wherein said bearing means includes an axial bearing comprising an insert plate formed of a sintered hard metal alloy, and a supporting plate formed of a material which is less hard and less wear resistant than said metal alloy; said supporting plate and said insert plate presenting opposed bearing surfaces; said insert plate having a larger diameter than the bearing surface of said supporting plate, said insert plate being mounted in said end surface of said bearing shaft such that an outer portion of a rear surface and a portion of a peripheral side edge surface of said insert plate are acted upon by cooling air from said flushing channel.

5. In an unsealed rotary drill of the type comprising a bearing shaft, a roller rotatably mounted on the shaft, cutting inserts carried by the roller, bearing means for rotatably supporting the roller on the shaft, and a flushing channel terminating at an end surface of the bearing shaft for conducting cooling air to the bearing means; the improvement wherein said bearing means includes an axial bearing comprising an insert plate formed of a sintered hard metal alloy, and a non-apertured supporting plate formed of a material which is less hard and less wear resistant than said metal alloy; said supporting plate and said insert plate presenting opposed bearing surfaces; said insert plate being mounted in said end surface of said bearing shaft such that an outer portion of a rear surface and a portion of a peripheral side edge surface of said insert plate are acted upon by cooling air from said flushing channel.

6. In an unsealed rotary drill of the type comprising a bearing shaft, a roller rotatably mounted on the shaft, cutting inserts carried by the roller, bearing means for rotatably supporting the roller on the shaft, and a flushing channel terminating at an end surface of the bearing shaft for conducting cooling air to the bearing means; the improvement wherein said bearing means includes an axial bearing comprising an insert plate formed of a sintered hard metal alloy, and a supporting plate formed of a material which is less hard and less wear resistant than said metal alloy; said supporting plate and said insert plate presenting opposed bearing surfaces; said insert plate being mounted in said end surface of said bearing shaft such that an outer portion of a rear surface and a portion of a peripheral side edge surface of said insert plate are acted upon by cooling air from said flushing channel, said bearing surface of said insert plate including groove means extending radially inwardly from an outer peripheral edge of said insert plate and communicating with said flushing channel solely at said peripheral edge.

* * * * *